INVENTOR.
Hans J. Stauber

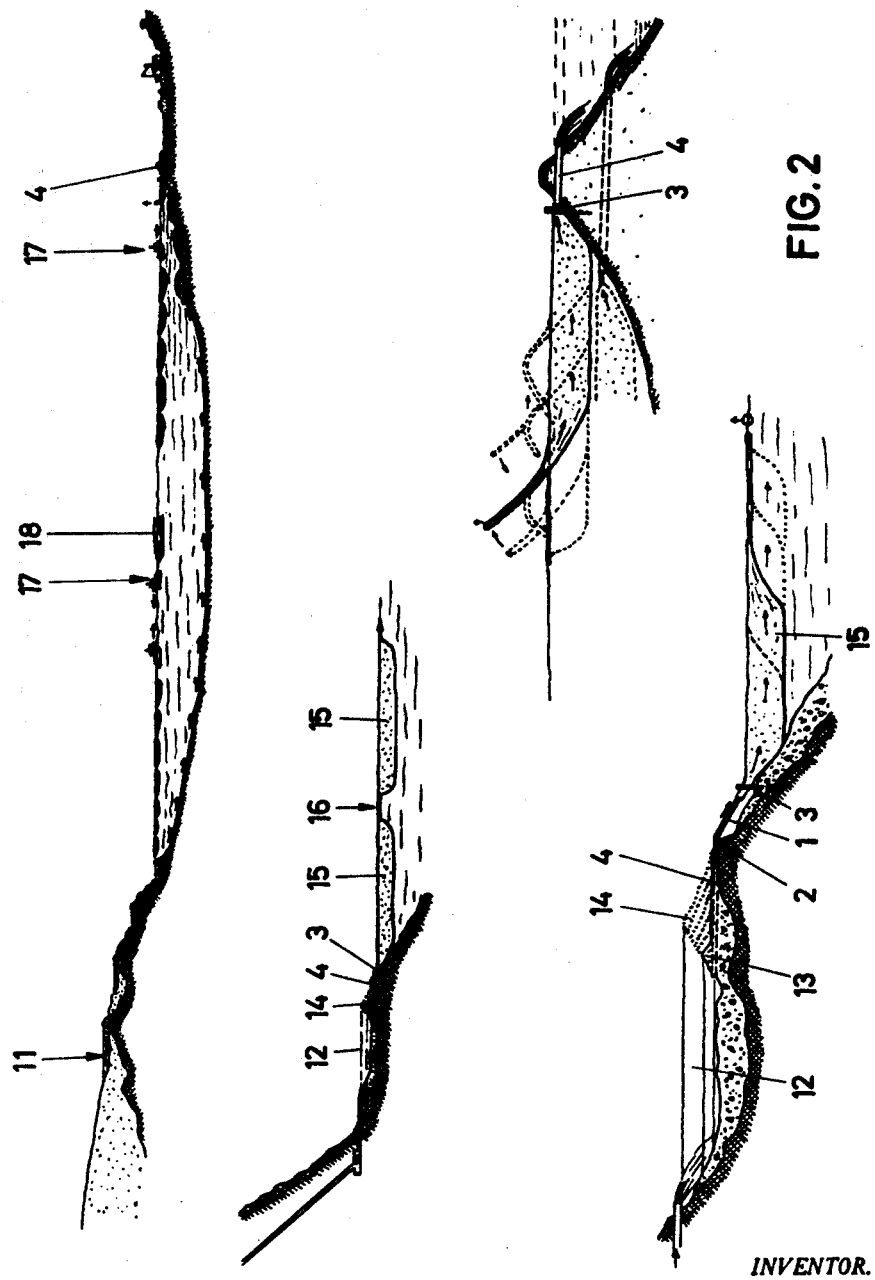

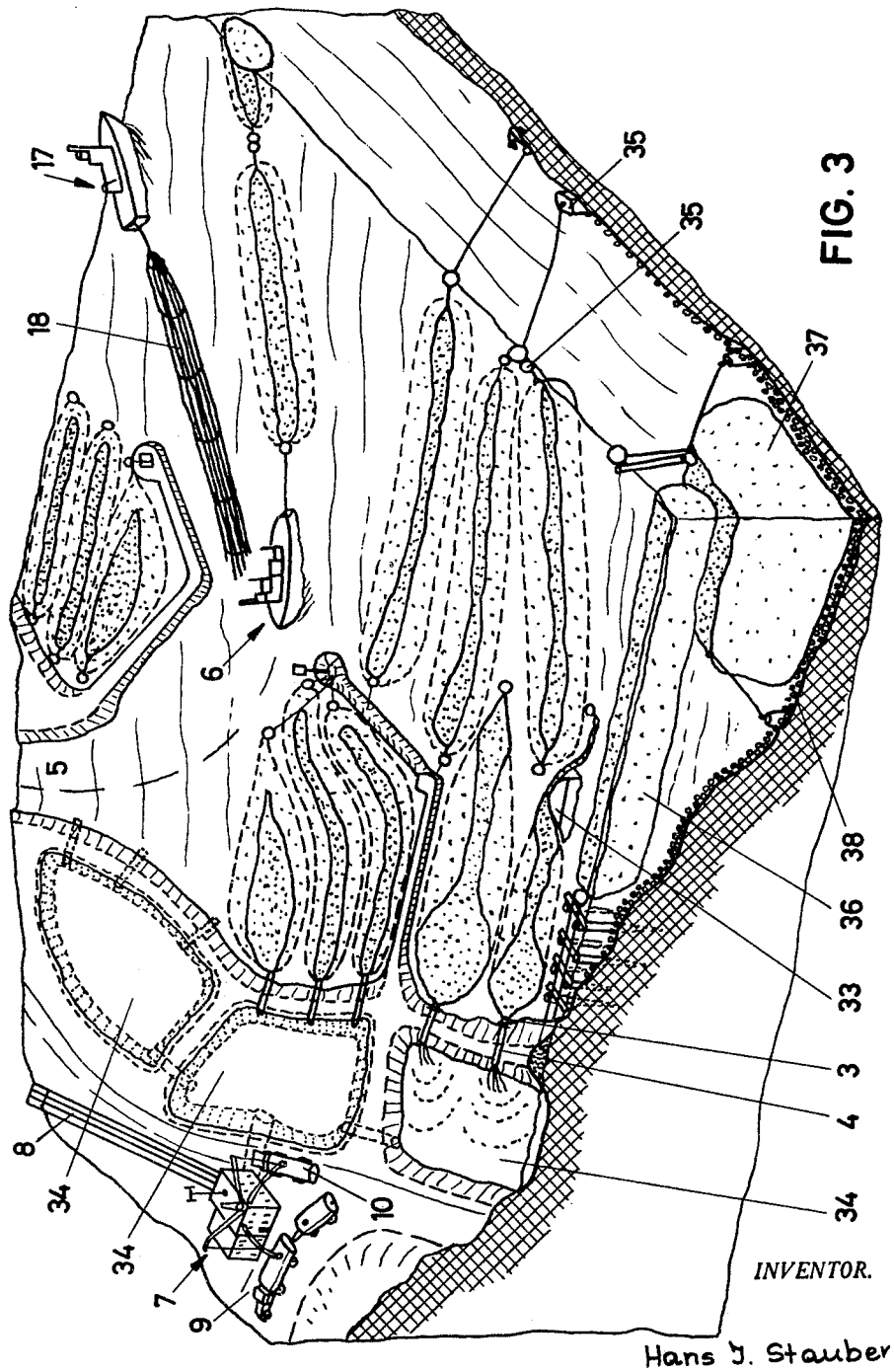

3,502,046
METHOD OF TRANSPORTING AND STORING LARGE QUANTITIES OF WATER
Hans J. Stauber, 65 Witikonerstrasse,
CH. 8032, Zurich, Switzerland
Filed May 6, 1968, Ser. No. 726,755
Claims priority, application Germany, May 19, 1967,
St 26,904
Int. Cl. B63b *35/00, 25/08*
U.S. Cl. 114—.5                                             8 Claims

ABSTRACT OF THE DISCLOSURE

The disclosed method for transporting and storing large quantities of water comprises the steps of gathering the water of a catchment area preferably by means of pumpless operating discharging machinery, of feeding the water from there to non-rigid underwater vessels suitable for holding large quantities thereof and being suitable for towing by ships, and of towing the vessels to arid areas where they are emptied again preferably by pumpless operating discharging machinery utilizing the tides, if possible. It is further disclosed that the underwater vessels may be used as water supply containers for storage purposes, which vessels may be anchored swimming in the water or rested on a bed of sand or round pebble stones.

BACKGROUND OF THE INVENTION

Field of the invention

The invention pertains primarily to a method of and apparatus for transporting large quantities of water by sea transport in non-rigid underwater vessels from areas on the earth where the water supply is abundant to arid areas. The invention relates also to a method of storing the water quantities in said vessels.

Description of the prior art

For the transportation of fluid goods it is well known to use tanker-ships, or pipelines, or tank waggons, or cars. It is, however, obvious that these means of transportation are insufficient to cope with the problem hereinafter described. Owing to the present development of population and industry an increasingly difficult situation arises with regard to the water and energy supply for all civilized countries. On the one hand the consumption and demand of these all-important goods has increased in accordance with the general development, while on the other hand almost all of the own water and energy sources and reserves are already utilized as best as can be. Additionally, the excessive utilization of many old sources and methods has led to harmful, even dangerous results. Water and air pollution, disturbances of the climate, careless working, growing of cities and industrialization has resulted in a noticeable decrease of the old output and as a consequence of these disadvantages many expensive additional purifiers and safety devices are required.

Having in mind this imminent exhaustion of the old fountain and fuel stock and also having in mind the limit of the tolerable water and air pollution it stands to reason that new, productive, healthy, and inexpensive water and energy sources must be looked for and must be opened up liberally on a large scale in order to ensure and strengthen the future economic development etc. as well as in regard to the public health and hygienics.

In lectures, publications, and representations it has been proven in Greenland and the polar countries the largest water and energy sources are nearly untapped and can in future be utilized by people in such unexhaustible quantities of estimated 500–2000 km.[3] gatherable and storable water from melted snow and ice annually which contain annually about 2–5000 billion k.w.h. utilizable energy given by nature and the warmth of the sun almost free of costs if rational methods and solutions are found to the problem of gathering and storing this huge amount of melted snow water in a simple way, then of using it for energy production and subsequently of conveying water and energy from the fjords to the consumer countries.

It is therefore an object of the invention to make accessible and utilize in future and as soon as possible these still untapped water and energy sources and resources of the Arctic (possibly of the Antarctic also) for the inhabited countries of the sub-tropic and warm zones and also in the worldwide fight against hunger etc. as well as for peace plans and underdeveloped countries. The main object of the invention is therefore a liberal realization of the above mentioned large-scale water and energy utilizing projects from Greenland and the polar countries, which project can be realized only in a general and liberal international cooperation in the common interest. However, for this soon necessary realization of the project good and new methods are of decisive significance, which methods must be developed, coordinated and organized skillfully and liberally and—similar to armament and atomic energy—must be financed generously as a general project including the following sequence of partial projects:

(1) melting snow water gathering and storing system on glaciers and in higher valleys, (2) high pressure glacier power station system on the shore of the fjord, (3) water and energy export and transportation system:

(a) large-scale water transportation and storing of water by means of swimming tank tubes, (b) high capacity and great distance transmission of energy by means of oceanic power lines (interlinking oceanic power line network similar to the great-distance overhead transmission lines), (4) transshipping installations, conveying and distribution systems for water and energy on the continents:

(a) transshipping installations, tanks, pump and pipelines for water distribution, (b) entrance points for feeding energy into existing and new interlinking power line networks.

It is important to mention that the utilization of the water is the simplest method that can soon be realized almost independently from the more complex power generation and utilization by means of distribution by oceanic power lines, because the large-scale project of water exploitation requires only the gathering and storing system, first power plant head race tunnels, certain filling installations, transport vessels, and tug boats. The exploitation of water can therefore be taken up in the same area with almost the same installations long before energy utilization begins. This is why especially the large-scale project of water transports should be promoted and developed, which can soon make possible worldwide deliveries of water. Further, this method of water transportation is more important and more interesting to realize because it not only entails but minor problems and costs, yet as a pre-stage belongs to the general large-scale project which includes energy production later on. Also, this method can simply and to advantage be applied at different places, i.e. practically all over the world, to water transports from fountains, from river mouths, lakes water ways to arid areas, areas of water shortage etc. The latter manyfold smaller ways of utilization further have the advantage that these everywhere necessary water transports can be started in small scale and can help to gather practical experiences for the bigger and large-scale projects and that money sources will begin to flow at an early time which can help development and can help to increase and improve the fleet of tank vessels which, in turn, helps to further the energy large-scale project.

Summing up the above described, it is the main object of the invention to transport water—the daily and everywhere necessary commodity (for men, industry, animals, plants and soil)—which is abundant at special places and from time to time, to far distant arid areas and areas of water shortage etc. in large quantities and to deliver and distribute it to desert and emergency areas. The problem to solve is therefore particularly one of transportation of a large volume mass good as for example mentioned at the "Water for Peace-Conference" in May 1967 in Washington, D.C., U.S.A.

In view of the mentioned facts according to which in Greenland on the huge areas of the inland glaciers at an altitude of 1000-2000 m. in every melting period of each year enormous quantities of water from molten snow become available which, before, subsided uselessly down to the fjords, and in view of the fact that for the construction of the before recommended glacier power plants for large-scale energy production this on the glacier uncontrolled subsiding water must be gathered and stored in any case in a collecting and storing system for subsequent utilization, the problem exists whether and how this collected water can be utilized still further. This means that the special problem is to solve how these already collected and tamed quantities of water can subsequently be used for the many areas of emergency and water shortage.

Since tank ships and water transports in submarine pipe lines over distances of more than 2000 km. and for large water quantities are uneconomical, too small, and practically unsolvable, cheaper and at the same time most efficient solutions for mass goods had to be looked for and found.

SUMMARY OF THE INVENTION

According to the invention this object is attained by collecting the water of the catchment area in collecting basins, preferably by means of pumpless discharging machinery and of conveying it to the known non-rigid underwater vessels suitable to be towed by ships, said vessels being adapted to hold considerable water quantities and being towed to arid areas where they are to be discharged, again preferably without pumps, utilizing the tides if possible.

According to the invention the catchment area cannot only be located in the melting water in arctic or antarctic zones, but also in the fresh water of clean rivers, or in lakes in zones having great amounts of rainfall.

This method of mass-transportation which can already today be realized was found according to the principle of balloon and airship navigation which transports inside of flexible tubes air or gas in large containers easily across far distances, as for example the airship having a 190.000 m.$^3$ gas filling. Smaller but reliable experiments and studies have confirmed that the same balloons soaring in the air can just as easily swim in the water and be transported if they contain a water filling, and that these properties and principles of nature are true also with large-scale balloons and airships. Thus they are, for example, also valid for a giant airship as is presently planned and constructed in model form by a certain engineer and which contains a filling of about 4 million m.$^3$. This airship, filled with water, can easily be transported while swimming in water. Thus, with just one airship tube 4 million m.$^3$ (or metric tons) of water can be stored and transported in the water. Basically, this is the same method of transportation and of movement of solid bodies in the water as is known from streamlined ships, submarines, boats etc. or from fish bodies so that this method should not present new problems and difficulties and should without doubt work with tank tubes of all shapes and sizes.

Air and gas can easily be moved and transported in balloons and airships in the air, while water and liquids can easily be moved and transported in watr-balloon-ships in the water using only one separating cover. The large assortment of the presently available suitable cover material having the required properties allows to decide soon after they have undergone examinations and trials upon their use for various sizes, shapes, and tasks. Following certain preliminary tests and experiences the best cover types and sizes can be manufactured in series-production.

It is a question of secondary importance whether and how the tubes—particularly for long distancce transports—are to be reinforced. Either by means of stronger longitudinal ties inside the cover, or reinforcing, stiffening and protecting by longitudinal ribs which are fixed to the outside and are formed as hollow round tubes made of plastic material into which water may be pumped for the purpose of regulating the draught. For convoys consisting of several large tank tubes one hauling rope may be provided which extends in longitudinal direction through the tank tubes from front end to front end down to the tug boat. The necessarily light and swimming hauling rope can be replaced by a tube made of plastic material resisting extension into which, if necessary, compressed air or water may be pumped from the tug boat or air may be released in order to regulate the draught of the tube. May be, even some sort of net could be used as is done with balloons. A further, still undecided question is whether the cover should be double, i.e. the outer cover a sturdy, tough protection cover and the inner cover a fine light lining which can separately be removed, mended or exchanged. Such a double cover would also have the advantage that with a hole or leak in the outer cover the inner lining would not be harmed. Rather would—with slight overpressure in the tank tube—the lining be pressed to the leak, thus closing it until the tube will be discharged and repaired. With the presently available tough, homogeneous, elastic, fine non-tearing and acid resistant plastic cover material doubts as to cover injuries are not justified if at the filling and discharge stations at the more shallow banks round pebble stone carpets are laid on the ground according to the regulations and because possible heavy ship or harbour collisions cannot cause injuries or leaks, and scouring like with ships can be prevented.

Also for the important filling and discharging of the tank tubes simple and practical methods had to be found. It is important that for the filling as well as for the discharging of the giant tube fillings no expensive pumps are required, rather should these working processes be accomplished by quicker operating and more effective and simpler installations. At the filling stations and docks and on the tug boat only a compressor should be installed for regulation of the draught of the tank tube by means of an air bubble and also for possibly necessary repairs of the covers. For repairing the covers and also for the annual inspection and cleaning of the tank tubes the cover will be inflated ashore or above the water surface like an air chamber.

With regard to the filling process the full intermediate- or reserve water basin should be arranged slightly higher than the tank tube so that the tank tubes, empty of air and water, can be filled at one end from the higher basin. This causes always a pressure compensation at the separating cover and only in the air bubble a slight overpressure will arise. For the filling as well as for the discharging process the different water levels of low and high tides can be utilized so skillfully that, as a rule, filling is better accomplished with the low tide and discharging with the high tide with a level difference of 6–10 m. being sufficient to ensure an accordingly quick filling and discharging of the tank tube and of the basin also (without pumps). With empty, ready to be filled and swimming tank tubes the water flow from the power station head race tunnels or from turbines or river mouths can be guided directly into the tank tubes. Since, for example, from Greenland in wintertime water export in tank tubes is hardly possible the still available water from turbines can be penned up behind ice dams much higher than in summer time and can be stored until spring—when tank tube transportation is again possible—under a protective ice layer.

When discharging the tank tubes the empty intermediate or reserve water basin should be as low as possible so that the full tank tube swimming high with the high tide can be emptied quickly and completely into the basin. By continuous lifting of the empty tube end this process can be speeded up and even with equal water levels the tube can be emptied without pumps. By lifting the tube end the water in the tube is also slightly lifted and caused to flow over a sill or threshold and via a channel or pipe line into the lower basin. The lifted tube end becomes increasingly empty and free from water and air, so that the cover is pressed together narrowly by the air, owing to the vacuum. The long cover can and will after discharge slide back into the water and there it swims on the surface. For transportation back for re-filling it can be tied together with other empty tubes to form a thick tube-bundle and to be hauled back by the tug boat across the ocean to the water source. However, smaller tubes can also be hoisted aboard.

The lifting of the tube end can be accomplished by suitable salvors or by ships which hoist the tube end to be lifted aboard the ship and across it, so that the empty tube end can slide back into the water on the other side of the ship. Larger water transhipping places are advantageously provided with lifting gears which are spanned over the discharge place of the underwater vessels. The gear holds the end to be lifted and this way successively empties the vessel. Further, at coasts with noticeable tides there can be provided a swimming trestle having legs of adjustable length. During high tide this trestle can be placed under the tube end to be lifted and set on ground by proper adjustment of the leg length. Coming low tide the tube end to be lifted remains on the trestle, thus causing the contents of the tube to be discharged at the opposite end.

To every tube end are mounted fitting and swimming large pipes capable of being closed, which are provided with swimming buoys each and with closing and coupling means, and further, comprising arrangements for guiding through and fastening pump tube and hauling rope. For the purpose of retrieving the underwater vessel at night without difficulty the buoys are to be provided with lamps. It is advantageous if the specific gravity of the material of the underwater vessels is lighter than water so that the vessels will not be lost in case of leaking buoys. If, moreover, the underwater vessels are manufactured with double covers, the inner cover being more flexible than the outer one, a leak in the outer cover will immediately be stuffed up by the inner cover which is pressed against the outer cover by the slight overpressure so that repair work can be performed without difficulty and without loss of water.

Every full and empty tank tube of any shape and size swims by itself like a raft or piece of wood, free but passively. It is unsinkable and needs no service or attendance. Storm and bad weather conditions can do it no harm but can only drift it away. Every tank tube can be anchored to the ground off coast like a ship or raft (illuminated at night), having its own anchor, or can be towed to buoys or to the shore.

A smaller boat can run against a filled elastic tank tube and will only be reduced in speed, a larger ship can probably press the tank tube down and slide across without the tank tube being harmed and torn, owing to its flexibility and toughness.

Preferably, it will be distinguished between transport tanks and storage tanks. Both types, however, can be exchanged one for the other. As required, transport tubes can remain in a port for some time as storage tubes if no empty basins are available or no water shortage exists. Conversely storage tubes can in case of water shortage be used for transports, at least if airship- or sausage-shaped. Further, it is of advantage, that the storage tubes of any shape and size in filled state can be displaced and moved to other places. They can even be towed from port to port and to any desired shore. Also, the back-transport on the water of the swimming tubes collected in bundles is simple and inexpensive and requires no other means of transportation. Moreover, the empty tubes are light and need only little space and can be inspected and repaired simply and cheaply. In order to use new coast stretches as new water transshipping places they must, of course, be inspected for their suitability and must be prepared somewhat with regard to access, anchoring opportunities, safety from storm, sharp rocks, pebble carpet etc.

Tank tubes for transport and storage must in storm and waves—like ships—not swing in a transverse position. In this case by discharging of air they can be lowered into the water, so that they will not be affected by the waves.

Further, for only one filling or discharging of a tube in a river opening, on the shore of a desert area etc. not many precautions are necessary, since the tube water can be emptied by pumps to a ship or to the shore. Also ships of any size can take over their fresh water supply this way simpler and cheaper than in the ports directly from the tank tubes near the port or on high sea.

Inspecting the water tubes for tightness is possible simply by checking the water level or the contents of the air bubble (pressure inspection). If a leak is found repair can in a simple way be accomplished by turning the tube in the water about its longitudinal axis until the leak emerges from the water and can then be mended. This way a tube may even be repaired during the transport. Turning the tube about its longitudinal axis can be supported by longitudinal ribs formed by air-filled tubes from which air is released and replaced by water, which causes the tube to turn about its axis.

The suggested tank tubes for giant water exports from Greenland to neighbouring and far distant countries and continents can be manufactured in all sizes according to the same principle of design from elastic, flexible plastic-rubber-canvas covers reinforced by longitudinal ribs. They can generally be used by all countries of the world for the manyfold present purposes at the below listed places (for transport and storage tubes):

(A) Giant water transport tubes of above 100,000 up to 1 million m.$^3$ capacity (1) Large-scale operation of exporting molten snow water from the inexhaustible sources of southern Greenland, as the world's largest and cleanest fresh water filling station, of about 500–2000 km.$^3$/annually of drinking-water and utility water.

(2) Tapping of water-abundant, still clean rivers of the nearest polar areas, rivers and power plants of Scandinavia, Finland, Iceland, Canada, Alaska etc.—transport of utility water and irrigation water from river mouths to settlement and industrial areas and coastal areas.

(3) Tapping of water-abundant, still clean rivers on other continents and in other countries of all latitudes in Central and South America, Africa, Australia, Asia etc.—transport of utility water and irrigation water from river mouths, lakes and power plants to all coastal places and towns, coastal and industrial areas, arid and desert areas.

(B) Small-scale water transport tubes of under 100,000 m.$^3$ capacity (4) Fresh water transports for all inland areas with rivers, lakes, inland waters particularly for navigation, rivers, inland channels, lakes, for enlarging, improving, and replacing the existing water supply systems, for reserves, breakdowns, emergency cases, catastrophes, dry periods, arid and desert areas.

(5) Sewage transports in the fight against water pollution in closely populated civilized and industrial areas, to collect dangerous sewage from settlements and industries or poisonous drains from break downs, for example from leaking oil or gas tanks or the like, from leaks in tank ships, which otherwise would poison the stock of plants and fishes in creeks, rivers, lakes and seas. At great, populated lakes even all the sewage of villages and towns can be collected in tubes and can be transported to a central sewage plant at less cost than the traditional way requires (saves pipe lines, sewage plants etc.). All towns near great lakes and rivers like, for example, near Lake of Constance, Lake of Geneva, Lake of Zurich etc. which have not yet built sewage plants of their own could, for example, be requested to acquire sewage tubes immediately and to collect therein all domestic and industrial sewage at the end of their sewage system and to deliver it to a central main sewage plant. An especially organized towing service for the whole lake would periodically and in the order of the towns and villages ashore pick up the full tubes, fasten it to the tug boat and convey it to the sewage plant. There they are pulled into a covered hall and emptied by lifting one end of the tube. Subsequently, the empty tubes are re-delivered in the same order. In the meantime the reserve tube is attached for filling, This way filling and discharging can be performed completely inodorous. The towing service can serve all villages and towns in a pre-established order and can, in the meantime, go for good fresh water from a distant lake fountain. Tube size, capacity and number of tubes must be chosen according to the sewage to be transported, to deepness and size of the lake—like the garbage removal is organized (possible oil and gas tank tubes on lakes and ocean). The sewage tubes with suspended particles in the sewage can be made to swim for transportation on the lake surface by introducing some air into the tube if necessary. This safe collecting method of all sewage would mean a cheap, significant and quick remedy for our polluted and sick lakes and rivers. The central main sewage plant should in this case of course be located at the lower end of the lake or river. Should a tube be filled ahead of schedule and cannot yet be collected, it can quite normally be disconnected from the sewage system, replaced by a reserve tube and left swimming aside without any danger. Every tube end with pipe is kept near the surface by a lighted buoy and is—like the tube itself marked in colour and by reflectors, so that it can be found and collected at night, if need be.

(6) Keeping of reserve stock and storage water reservoir for securing the water supply by means of large-scale and small-scale transports and storage water tubes. This method can unexpectedly prove essential for villages and towns directly at or near lakes, rivers or the ocean in case of catastrophes, big fires, floods, earthquakes, aridity periods, pipe line leakages, break downs of reservoirs, dirt accumulation or poison or oil in the potable water distribution system—similar to other important supplies. For every village there could and should a filled or at least ready to be used reserve water tube be ready for potable water as well as for sewage. The tube could be stored on the deep and cool bottom of the lake, with the introduction of compressed air hoisting the tube and with releasing of the air sinking it. For a whole lake or settlement area a big reserve reservoir tube is recommended which can go in action if in a village the water supply breaks down. Quickly the reserve tube can be towed to the village and the water system can be connected to it temporarily.

(7) Also good, rich but too distant sub soil water fountains and fresh water fountains in river and lake catchment areas, where pipe lines would be too long, too expensive, and too difficult can be utilized by this new water transport method, if need be. Of course, this water sources and fountains should first be framed and conducted to the nearest lake or river. Instead of artificial basins and land-reservoirs and in addition to the oblong, streamlined transportation tubes so-called storage tank tubes of a more round, balloon-like shape can permanently be stationed at favourable places ashore. Such large-scale storage tubes containing one to several million $m.^3$ water can serve well great villages and towns, seaside resorts, industries, desert areas near lakes and oceans. Also the above mentioned necessary storage basin into which the transportation tubes are emptied for storage and distribution can be a large-scale storage tank tube which is solidly placed on favourable ground or left swimming. Finally, such permanent storage tanks can be established in the open country in existing gravel pits, in quarries, clay pits, foundation ditches, in naturally or artificially smoothed basins or in rock or earth cavities, by smoothing ground and side walls, laying in and snugly fitting in a tough rubber-plastic-cover and filling it with clean potable or utility water.

Said cover basins, which are to be established, like swimming pools, as open or tube-like covers can for filling or discharging be operated according to the same water displacement method, i.e. by slow and continuous lifting of the filled cover end. The cover material must be, like army rubber boats, tough, elastic and readily repairable and inspectable from the outside.

The storage places should have a sand or gravel layer and should protect the tubes from pointed, sharp rocks and other objects. Transfuse from larger into smaller tubes and, vice versa, from transport tubes into storage tubes is simple and easily possible according to the same principle of lifting one tube end. The slow lifting of the tube end can be performed by a tug boat, a crane, or a suspension rope. The contents of the lifted tube portion flows into the attached empty cover and the just emptied tube portion slides after lifting back into the water, where the empty tube without air and water swims free and stretched out, like the initially empty tube now to be filled.

As can be seen, there are many solutions and possibilities of combination of methods of water transportation and storing using all kinds and sizes of transportation and storage tank tubes which can advantageously be adjusted skillfully to the prevailing conditions of transport, lake, sea, bottom and shore, further to demand and quantity conditions. Economic strengthening and fertile cooperation of the countries by the Greenland large-scale project: Greenland, for example is situated safe between the old and the new world and—as described above—with her unexhaustible water and energy sources she can accordingly supply inexpensive quantities of water and energy. What Europe and Northern America begin to lack and what they absolutely need for their future recovery and strengthening after two paralysing world wars is a reconstruction and a sound development based on sufficient raw material and energy for their economical strength and independence, however also for their physical, moral and spiritual health, and for their spiritual renewal for a new, closer, more generous and more far-sighted cooperation for the big tasks like EEC and UNESCO. The presently in an alarming manner increasing air and water pollution and the danger of poisoning of food and living areas in practically all settlement and industrial areas of the over-populated European and American countries can be prevented only by improved and safer methods in industry and power plants, particularly by undangerous, harmless and clean methods of water and energy production. Only with healthy air and clean water, but also only with unpoisoned food and uninfected living areas for people, animals, plants and country sides there is possible a future, sound, and progressive living of an efficient cultured nation. With the present speed of almost impetuous development, with new industries, motor cars, oil heating and many other combustion installations, thermic and atomic power plants, with water pollution, application of chemicals, poison and plastic material spraying of insecticides, chemical water and food treatment, there will generally be an alarming summing up of poisonings, infection by fumes, poisonous and stimulant substances and atomic rays, with the enormous consumption of oxygen and production of carbon dioxide not even mentioned. These effects may even cause threatening climate disturbances which in a few decades can become so unbearable—in spite of many expensive counter measures—that man must flee from his own poisoning.

DESCRIPTION OF THE DRAWINGS

The invention will be more readily comprehended from the following description when taken in conjunction with the appending drawings, wherein FIG. 2 shows the principle of the water transportation method, FIG. 3 is an example of a port installation used as water transsshipping place for said underwater vessels.

DESCRIPTION OF THE PREFERRED EMBODIMENTS

Figure 1:
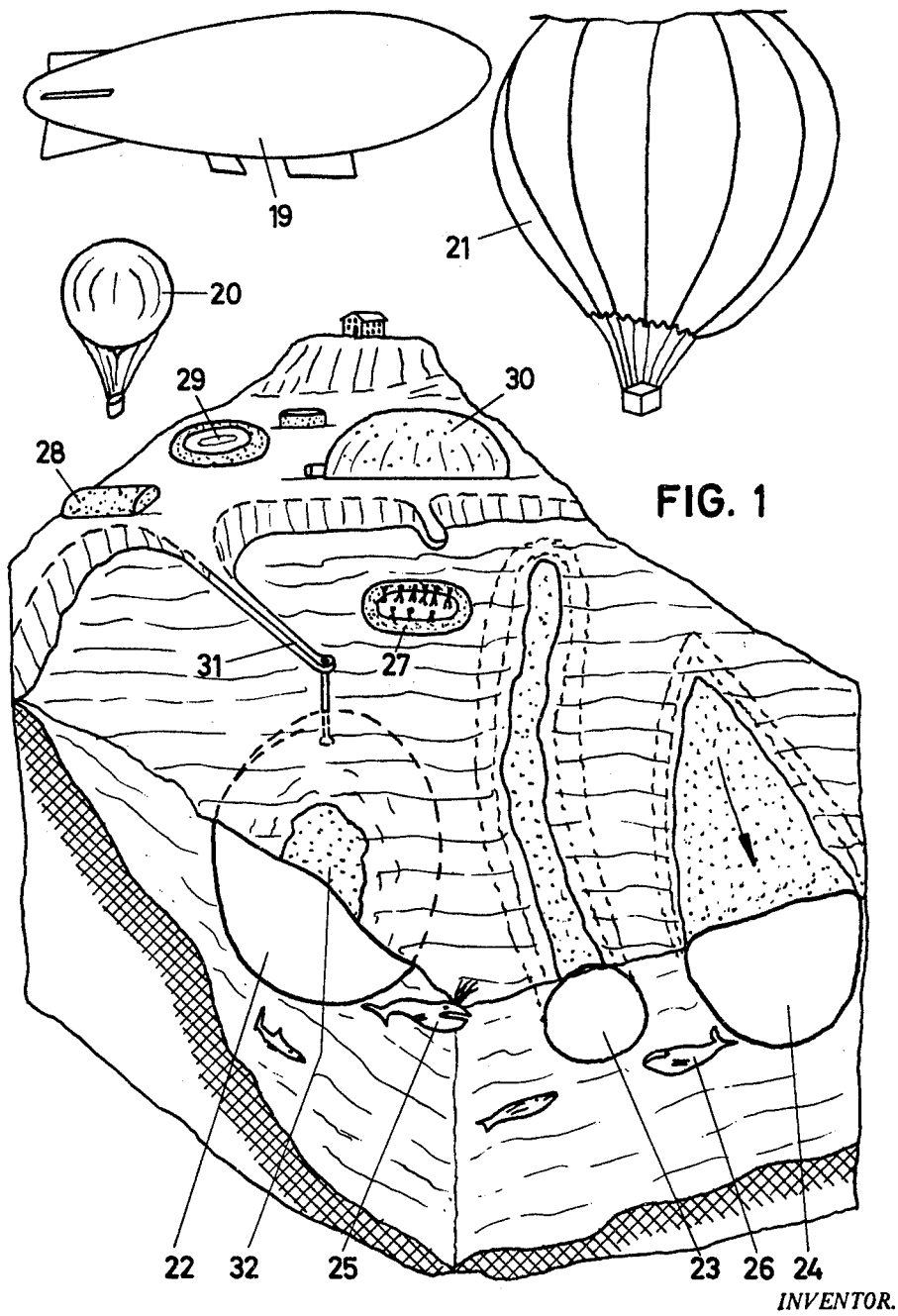
FIG. 1 shows various embodiments of underwater vessels in comparison to the corresponding air crafts.

The illustration of FIG. 1 shows in what manner the tank tubes are employed. Just as, for example, airships 19, balloons 20 or Montgolfier balloons 21 transport gas in gas, can similar containers be transported in water if they are liquid-filled. 22 is a ball-shaped tank for stationary storage (water balloon) while 23, 24 are tank tubes for transportation (water ship). Tank tube 23 is sausage-formed, while tank tube 24 is of hydrodynamically favourable shape, similar to an air ship.

The ball-shaped tank 22 which corresponds to the balloon 20 is filled or discharged respectively by means of the cantilever arm 31. The elevation of tank 22 is controlled by a regulable air bubble 32. For the purpose of comparing shapes and sizes whales 25, 26 are shown in the illustration. In contradistinction to the tank tubes 22, 23, 24 there are also shown non-rigid and semi-rigid storage and transportation means of known design like the rubber boat 27, the storage tanks 28, 29 and the inflatable hall 30.

It should be mentioned, however, that with these large-scale projects and methods with every project one depends on many and differet factors that cannot be pre-calculated. Such factors include the conditions of nature, the structure of soil and coast lines, ocean, weather conditions etc. which cannot be pre-calculated and pre-determined like can be done with purely technical designs, such as machines. A model or trial construction would be too expensive and unnecessary in view of a preferred step by step development. However, small-scale tests with air and water balloons can be performed at any time. The first Atlantic crossing with a tug boat convoy will certainly not be undertaken with five or six large tubes but with one or two small ones in order to gather experience. Moreover, the first voyages should be on inland waters (Lake of Constance, Lake of Geneva etc.) as well as the first tube fillings, dischargings and storages. The method must and can best be developed continuously from small beginnings until, finally, single tubes or convoys are transported of 5, 10, 20 and possibly more million cubic meters, provided the cover material can continuously be improved, to which, however, there are probably limits. Certainly, the towing, pulling and sailing technique will be of importance too, since the moment of inertia of an unmoving tube containing several million cubic meters of water needs, like big ships, a long sustained continuous pulling force for the start. For moving and accelerating the tube and for reducing its speed a smooth and continuous pull is required, corresponding to the strengh and the shape of each tube, which must be tested for each tube in advance so that the tube will not roll or vibrate at certain speeds and shapes.

For filling and discharging the tube the end of its pipe is clamped ashore between two posts in a kind of yoke and connected to the filling or discharging pipes in the dam. Storage tanks can be kept on the surface either by swimming buoys and air bubble or down at the lake or sea bottom on the pebble carpet by ground buoys and without air bubble. By disconnecting from the buoys and introducing compressed air, the storage tanks can be hoisted from the bottom, emptied and removed. During the warm summer time and in tropic areas the water should be left in the tubes as long as possible in order to avoid evaporation and warming up. For cooling the tube can either be sprinkled with water or sunk deeper into the water. For the open basins there are also means available today adatped to keep evaporation at a minimum (covers, protective layers etc.). Right from the beginning in all areas the tubes should be distinguished as to tubes for drinking-water, for utility water and for irrigation water. Spoiled drinking-water can simply be used for utility water.

Even if there is in much populated countries and areas with villages, towns, industries etc. already a dense water supply system comprising exclusively pipe lines in the earth, but lacking increasingly in productive fountains, thus causing frequent water shortages, a central and favorably located feeding place should be looked for and installed, so that such large-scale water imports if necessary can supply the whole supply system. Particularly, however, said large-scale water transports are meant for emergency, arid and desert areas, for whole countries with living and culture areas which are lacking water chronically, and where every aridity period causes heavy losses to culture, bad harvests and famine. For such far distant but otherwise large productive areas without sufficient water resources and without other possible means of water supply the new method of large-scale water transports on and in the water to every desired coast can help efficiently and lastingly in the fight against the worldwide perils of exsiccation, of deserts and against hunger, as the all important help for underdeveloped nations, as "Water for Peace."

The necessary water, however, must not under all circumstances be brought in from Greenland or the polar areas, but should first be taken from the own country in the nearest river mouth and should from there be transported to other water-lacking coasts and ports. Since it is possible to fill tank tubes by means of simple, even provisional installations, for example in rivers, creeks, lakes, channels, and at the shores of any desired ocean, and since it is just as possible to bring by every large-scale transport enormous quantities of water near emergency areas and areas of water shortage, which transports are easily emptied, the costs for the water will be accordingly minimal and will not amount to anything compared to the advantage, if only in the country of consumption the water is rationally used and saved. Thus, it can be said that these all important large-scale water transports—from almost free of charge sources—to needly countries and nations will certainly be much more effective and productive than money—or even grain imports because early and timely water supplies for arid areas will prevent or lessen bad harvests and famines, and, moreover, many primitive, unhealthy living, supply, and hygienic conditions of the population can be improved. Sufficient water supply will in most cases at the same time fight efficiently water pollution since the additional water from the water transports will dilute the dirt and sewage and thus will make possible sewage systems and sewage plants.

FIG. 3 shows a water transsshipping place wherein different possibilities of the further water transportation into the country are illustrated. This can be done either on water ways also with tube convoys or on open or covered channels, using pumps for high located reservoirs and for water pipe lines, for filling stations for tank cars and wagons, or for the water filling process for tank and cargo ships in the port. With a well established and good organized water supply according to the new method in the future investments for such transshipping places and port installations for a large, fertile and inhabited hinterland will certainly pay off if previously planned well and far-sightedly.

In order to prove the sufficiency of such water supply an illustrative calculation of quantities for a well-organized tank tube, large-scale water transport and supply service for one country will be given below. An assumed daily water supply to one transshipping place of 10 smaller or one larger tank tube containing 900,000 m.³ water woud equal a river or channel of $3 \times 3 = 9$ m.² running 24 hours, i.e. more exactly a 10 cubic meter/sec. or 10,000 liters/sec. water flow, which flow could feed large water supply systems extensive irrigation installations. One convoy containing 9 million m.³ per day for a whole country would result in a major clean river for perpetual use which would mean a new great life line even for major countries, a saviour from chronic famine and disease, from want and war. For example, for Israel this would mean a second "Irrigation-Jordan" which would solve many problems and prevent further border-line and water wars.

As has been already mentioned the same tank tube construction and transportation method can not only serve clean water transports but also, conversely, transports of sewage. Strong giant tubes can take in all the sewage of villages or even towns along lake, river, channel and sea shores and can transport it down the river or down the lake harmlessly to a central sewage plant or into the countryside for irrigation and fertilization. This would mean a fully efficient fight against the much feared expensive water pollution of most countries. These sewage-collecting tubes can be filled and emptied the same way with even better possibilities of sealing off sewage and odour as with present sewage systems. Such inexpensive simple wholesale water supply and sewage removal with its installations would certainly mean a more effective, longer lasting development aid then many other projects which the western countries with their technical progress and probably richest water reserves would perform to other neighbouring and underdeveloped countries, besides direct cases of emergency like India.

In FIG. 2, upper section, there is illustrated how the molten snow water via a glacier power plant is collected in a basin 11, then conducted via a channel to a second basin and from there via pressure pipe lines down to the central power station and finally to an intermediary basin 12. From the intermediary basin 12 and the wall of which can be an earth or an ice dam 13 or 14, the water flows via discharging pipes 14 into a tube-like underwater vessel 15. This way the vessel is gradually filled with water until, finally, it assumes the shape of a cylinder covered at the ends by round caps, or, after complete filling, an airship-like shape. These tank tubes can be coupled together by means of couplings 16 and arranged to form a convoy drawn by a tug boat 17. The convoy brings the filled tank tubes 15 to the water-needy places, where the tank tubes—similar to the filling process—are clamped with one of their ends under a yoke, connected to the discharging pipes 4 and lifted at the opposite end. This causes the water to be removed from the tank tube. The empty tube remains swimming as the result of small air enclosures and has little specific gravity so that the tubes can be emptied successively and the empty tubes can be pushed aside swimming. After complete discharging of the whole convoy the tubes 15 are collected in bundles 18 and are towed to a tug boat for transport back. The single phases of the discharging process are illustrated in the lower right corner of FIG. 2. Advantageously, emptying is performed during high tide which requires only a slight raise of the tube. If for discharging during high tide a trestle with adjustable legs is swum under the tube and if the legs are then sunk to the ground, then the tube can be emptied without difficulties with low tide coming, owing to the difference of the water level inside and outside of the tube.

Finally, FIG. 3 shows a port side for transshipping of fresh water transported across the ocean. The tank tubes are in yokes 3 coupled to discharging pipes 4, lifted at one end by swimming, driven displacement objects 33 which causes the fresh water to flow into the collecting basin 34. The emptied tank tubes are secured to swimming buoys or underwater buoys 35. Further, there are illustrated in FIG. 3 storage tanks 36, 37 with the tank tube 36 shown swimming, the tank tube 37, however, is shown rested on the bottom. Below the swimming tank 36 as well as particularly below the resting tank 37 there is provided a carpet of round pebbles in order to prevent injuries of the tanks.

What is claimed is:
1. A method of transporting and discharging large quantities of water, said method comprising the steps of:
 (a) positioning in a body of natural water at least one vessel which is non-rigid or which is made of a flexible sheet-like material
 (b) causing the water in which the vessel is positioned to flow into the vessel while controlling the specific gravity of the vessel for maintaining the vessel in floating condition in the body of water;
 (c) towing the vessel to a receiving area which is subject to a tidal difference between high and low tide and allowing the vessel to remain in the receiving area while conditions of high tide prevail;
 (d) as the tide falls, maintaining the vessel at the elevation at which the vessel is under conditions of high tide; and
 (e) during the period between high tides, discharging the water from the vessel under the influence of gravity in consequence of which the vessel is discharged without the utilization of any extraneous source of power.
2. A method according to claim 1, wherein the body of water of step (a) is likewise subject to a tidal difference and wherein step (b) is carried out during low tide.
3. A method according to claim 1, wherein said step (d) is carried out by floating a trestle underneath one end of the vessel during high tide.
4. A method according to claim 1, wherein said step (d) is carried out by lifting one end of the vessel with a crane.
5. A method according to claim 1, wherein said step (b) is carried out by maintaining a quantity of air in the vessel.
6. A method according to claim 1, wherein the water is non-polluted water.
7. A method according to claim 2, wherein the water is sewage, and further comprising the step of treating the sewage at said receiving area.
8. A method according to claim 1, wherein the body of natural water has a bottom bed of sand or round pebble stone and the vessel is, during step (a) anchored on the bottom bed.

References Cited
UNITED STATES PATENTS
3,289,415   12/1966   Merrill _____ 61—1

TRYGVE M. BLIX, Primary Examiner

U.S. Cl. X.R.
114—74